(12) United States Patent
Kim

(10) Patent No.: US 7,059,240 B2
(45) Date of Patent: Jun. 13, 2006

(54) DOUBLE HEATING-TYPE POTS

(76) Inventor: Myung-Suk Kim, 111-1, Sisan-ri Daesul-myeon, Yesan-gun, Chungcheongnam-do (KR)

( * ) Notice: Subject to any disclaimer, the term of this patent is extended or adjusted under 35 U.S.C. 154(b) by 65 days.

(21) Appl. No.: 10/945,041

(22) Filed: Sep. 20, 2004

(65) Prior Publication Data

US 2005/0247208 A1   Nov. 10, 2005

(30) Foreign Application Priority Data

May 10, 2004   (KR) ............... 10-2004-0032692

(51) Int. Cl.
*A23L 1/00* (2006.01)
*A47J 37/00* (2006.01)
*A47J 43/00* (2006.01)

(52) U.S. Cl. .............. 99/339; 99/340; 99/345; 99/403; 99/417; 99/422; 99/447

(58) Field of Classification Search ............ 99/339, 99/340, 345–347, 403–417, 422–425, 444–450, 99/400, 407; 126/369.2, 369.1, 377.1, 390.1, 126/389.1; 220/912, 830, 827, 671, 203.03, 220/212.5, 366.1, 379, 369, 743, 573.1, 574.1
See application file for complete search history.

(56) References Cited

U.S. PATENT DOCUMENTS

| | | | | |
|---|---|---|---|---|
| 1,460,380 A | * | 7/1923 | Hughes | 99/425 |
| 1,963,294 A | * | 6/1934 | Davis | 99/403 |
| 4,574,776 A | * | 3/1986 | Hidle | 126/369 |
| 4,823,980 A | * | 4/1989 | Ejiri | 220/573.1 |
| 5,228,384 A | * | 7/1993 | Kolosowski | 99/342 |
| 5,415,082 A | * | 5/1995 | Nagao | 99/403 |
| 5,992,671 A | * | 11/1999 | Wardani | 220/293 |
| 6,263,787 B1 | * | 7/2001 | Tseng et al. | 99/413 |
| 6,293,271 B1 | * | 9/2001 | Barbour | 126/25 R |
| 6,305,272 B1 | * | 10/2001 | Lin | 99/371 |
| 6,360,654 B1 | * | 3/2002 | Cornfield | 99/339 |
| 6,401,602 B1 | * | 6/2002 | Lin | 99/339 |

FOREIGN PATENT DOCUMENTS

| | | |
|---|---|---|
| JP | SHO-46-006128 | 4/1971 |
| JP | SHO-48-020981 | 9/1973 |
| KR | 0204601 | 12/1999 |

* cited by examiner

Primary Examiner—Timothy F. Simone
(74) Attorney, Agent, or Firm—Galgano & Burke, LLP

(57) ABSTRACT

Disclosed herein is a double heating-type pot. The pot includes air inlet holes at an upper portion thereof to introduce heated air into the pot. Further, a guide unit is provided on an outer surface of the pot to efficiently guide heated air to the air inlet holes. Thus, the present invention allows heat conducted through the bottom of the pot and convection heat transferred through the air inlet holes to eliminate a temperature difference between upper and lower portions in the pot, therefore reducing cooking time and evenly heating food.

3 Claims, 4 Drawing Sheets

DOUBLE HEATING-TYPE POTS

BACKGROUND OF THE INVENTION

1. Field of the Invention

The present invention relates generally to double heating-type pots, and more particularly, to a double heating-type pot, which includes air inlet holes at an upper portion of the pot to introduce heated air into the pot, and includes a guide unit on an outer surface of the pot to efficiently guide heated air to the air inlet holes, thus allowing heat conducted through the bottom of the pot and convection heat transferred through the air inlet holes to eliminate a temperature difference between upper and lower portions in the pot, therefore reducing cooking time and evenly heating food.

2. Description of the Related Art

Generally, cooking utensils, such as pots and frying pans, are used for cooking food at homes or in restaurants. The cooking utensils are made of materials with excellent heat conductivity, such as stainless steel or aluminum, and have different shapes and sizes according to an intended purpose or the amount of food to be contained therein.

Pots include a cooking unit and a lid. The cooking unit contains food therein, and is heated by flames provided by a heating means. The lid covers an open upper portion of the cooking unit. Heat is conducted to the cooking unit to heat an interior of the pot, and the lid prevents the heat from escaping to the outside.

Recently, cookers have been proposed, which have a hole at a predetermined position on a cooking unit to introduce heated air into a cooker, thus enhancing cooking efficiency. The conventional cookers are found in Japanese U.M. Sho-46-006128, Japanese U.M. Laid-Open publication Sho-48-020981, Korean U.M. Registration No. 0204601, etc.

The conventional cookers will be described below in brief. As shown in FIG. 1, Japanese U.M. Sho-46-006128 relates to a steam cooker. The steam cooker includes an outer pot 12. Holes 16 are formed along an edge 13 provided around an upper portion of the outer pot 12 to communicate with a gap 15 defined in a lid of the outer pot 12. A plurality of small holes 14 is formed around an upper portion on a sidewall of an inner pot 11 placed in the outer pot 12. During steaming food, a bottom of the steam cooker is heated, so that heat is conducted to an interior of the steam cooker. Further, some heated air outside the outer pot 12 flows through the small holes 14 into the steam cooker, while some heated air flows through the holes 16 into the gap 15. Thus, a temperature difference in the steam cooker is eliminated, and thereby cooking is rapidly carried out. However, the steam cooker is problematic in that it must be provided with two pots. Further, it is difficult to apply a structure of the steam cooker to common pots.

Further, as shown in FIG. 2, Japanese U.M. Laid-Open publication Sho-48-020981 relates to a cooker. The cooker includes a heat generator cover 25 above a heat generator, with a plurality of oil holes 26 bored in the cover 25 at predetermined positions. A rod 27 is fastened on the upper end of the heat generator cover 25 for taking out the heat generator cover 25. Heated air is fed through the oil holes 26 into the cover 25, thus increasing heating speed. However, the cooker is problematic in that it must be provided with a plurality of pots. Further, it is difficult to apply a structure of the cooker to common pots.

Korean U.M. Registration No. 0204601 relates to a cooker. As shown in FIG. 3, the cooker includes a cooking vessel 30. A support part is provided around an upper edge of the cooking vessel 30, and a contact rim 32 is provided along an upper surface of the support part. Exhaust holes 33 are formed on the contact rim 32 at regular intervals. Combustion holes 34 are formed through the support part at positions outside the contact rim 32 such that the combustion holes 34 are aligned with the exhaust holes 33. Further, a plurality of hot air holes 35 is formed through the support part at positions inside the contact rim 32. Thus, when fumes and odors generated in a cooking chamber are discharged through the exhaust holes 33, combustion of the fumes and odors is executed by hot air discharged through the combustion holes 34. However, such a cooker is problematic in that an additional cooking vessel is required inside the cooker. Further, since a through hole 37 and slits 38 must be provided on a support plate 36 to guide heated air, the shape of the cooker is very sophisticated, thereby it is very difficult to manufacture the cooker.

SUMMARY OF THE INVENTION

Accordingly, the present invention has been made keeping in mind the above problems occurring in the prior art, and an object of the present invention is to provide a double heating-type pot, which has air inlet holes at an upper portion of the pot to introduce heated air into the pot, thus allowing heat conducted through an outer surface of the pot and convection heat transferred through the air inlet holes to eliminate a temperature difference in the pot, therefore reducing cooking time and evenly heating food.

Another object of the present invention is to provide a double heating-type pot, which has a guide unit on an outer surface of the pot to guide heated air, thus enhancing heat efficiency.

In order to accomplish the above object, the present invention provides a double heating-type pot, including a container to contain food therein, a heating unit extending outward from an upper end of the container, with at least one air inlet hole formed at a predetermined position on the heating unit, and a seating unit extending upward from an end of the heating unit and having at least one air outlet hole which is bent at an upper end thereof outward, with a lid seated on the seating unit.

In the pot constructed as described above, part of the air which heats an outer surface of the container by a heating means is fed into the container through the air inlet hole, thus evenly heating food contained in the pot.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
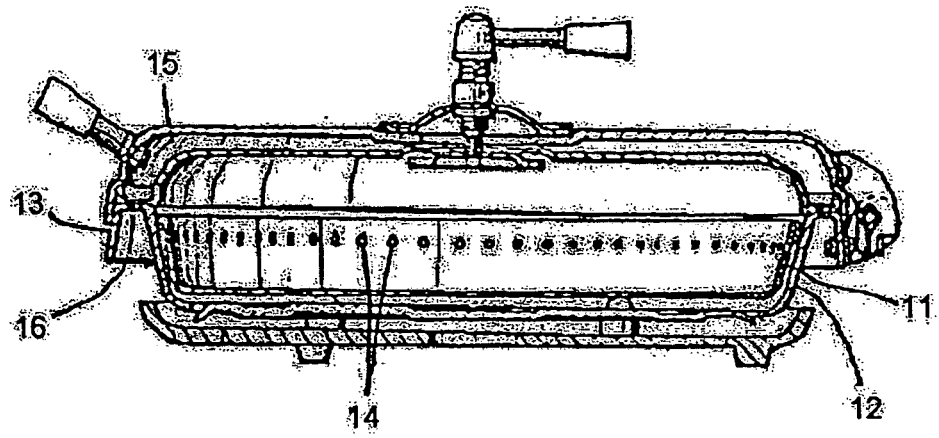
FIGS. 1 to 3 are views to show conventional cookers having air inlet holes for passing heated air, when the cookers are heated.
Figure 2:
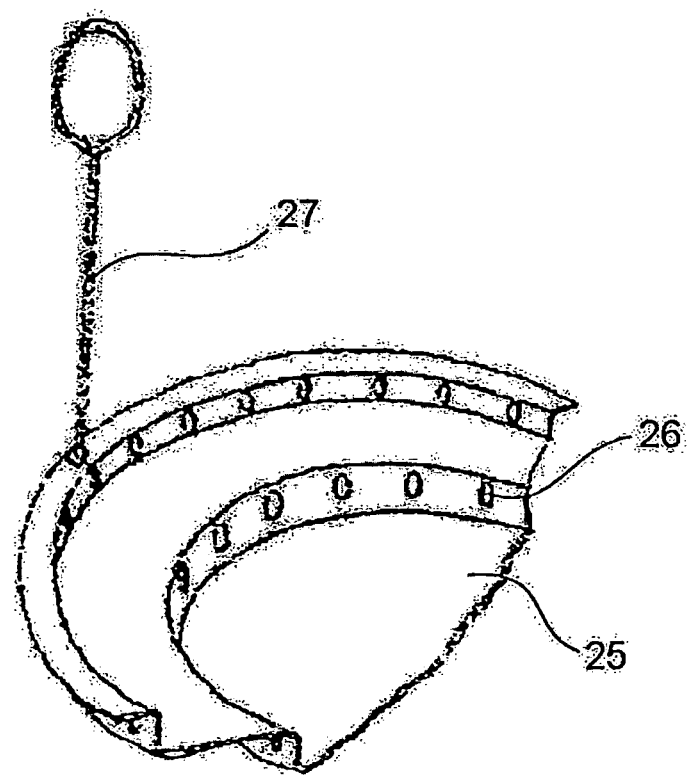
Figure 3:
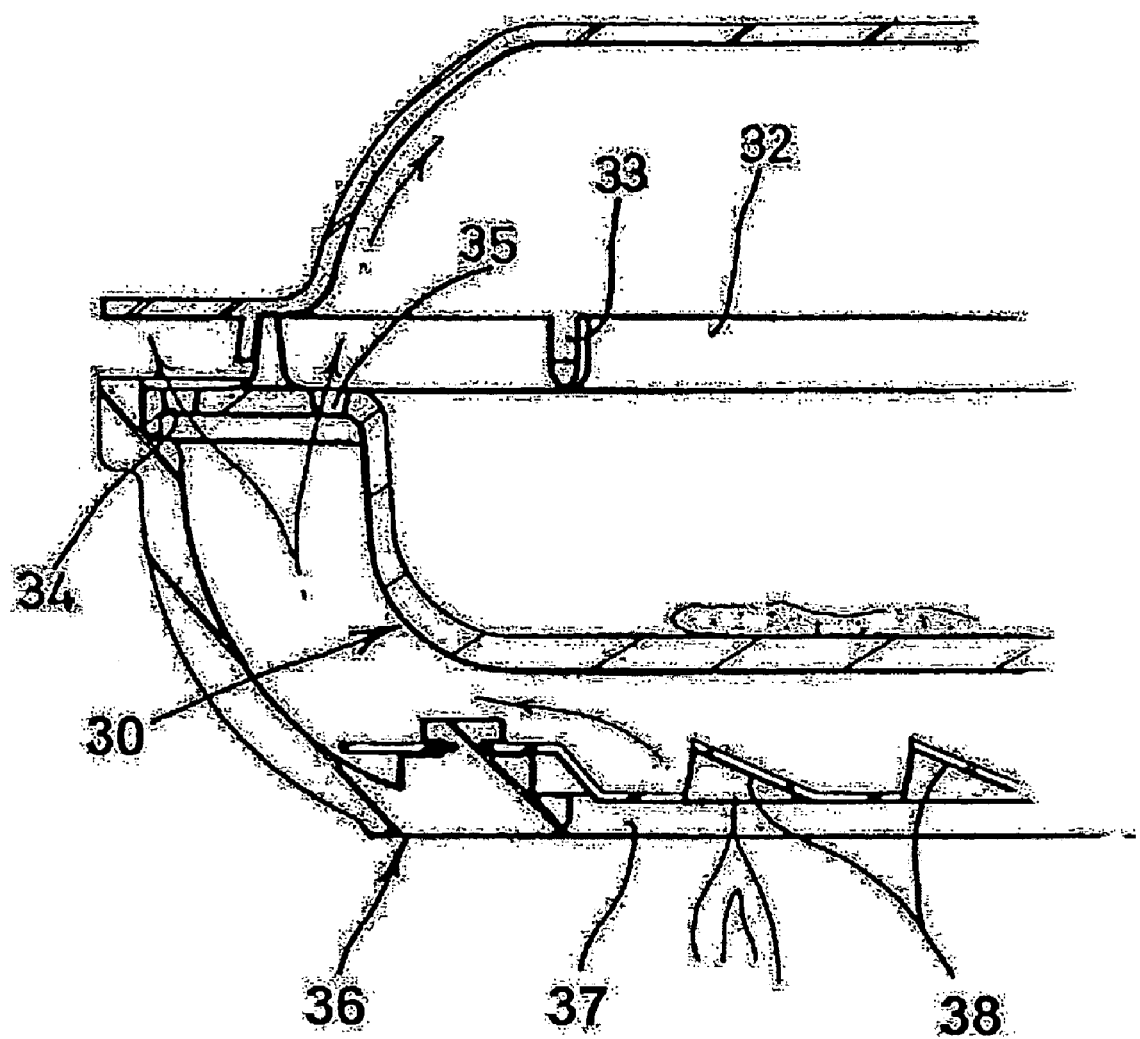

Hereinafter, an embodiment of the present invention will be described in detail with reference to the attached drawings.

The preferred embodiment of the present invention is disclosed for illustrative purposes, and it is to be understood that the invention is not limited to the preferred embodiment thereof. Those elements common to both the prior art and this invention will carry similar reference numerals.

Figure 4:
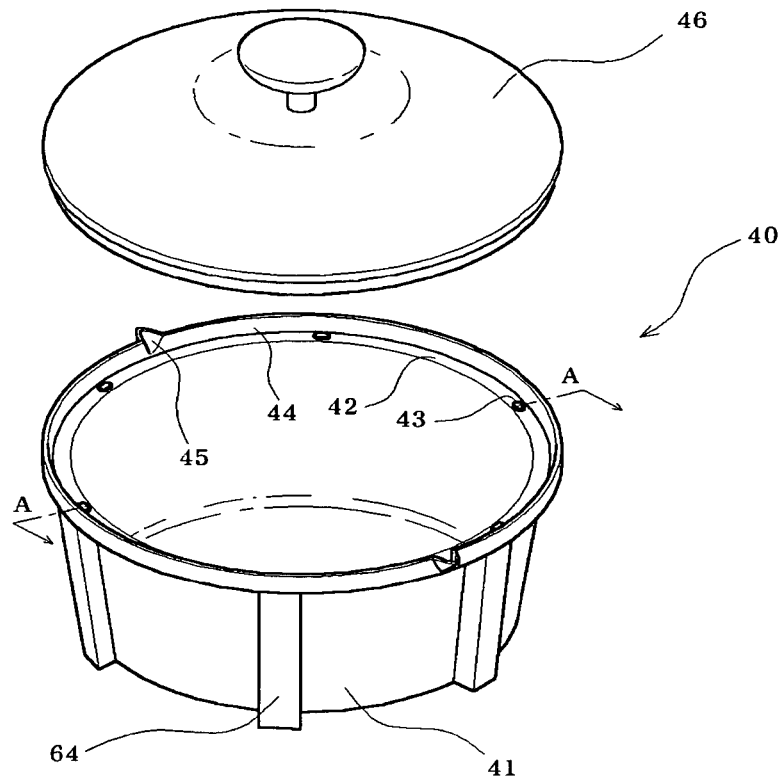
FIG. 4 is a perspective view to show a pot, according to the present invention.
Figure 5:
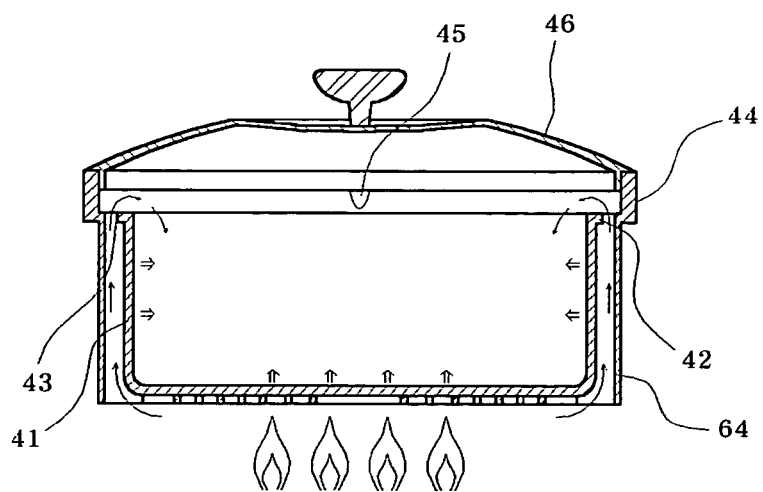
FIG. 5 is a side sectional view taken along the line A—A of FIG. 4, showing heat transfer in the pot.
Figure 6:
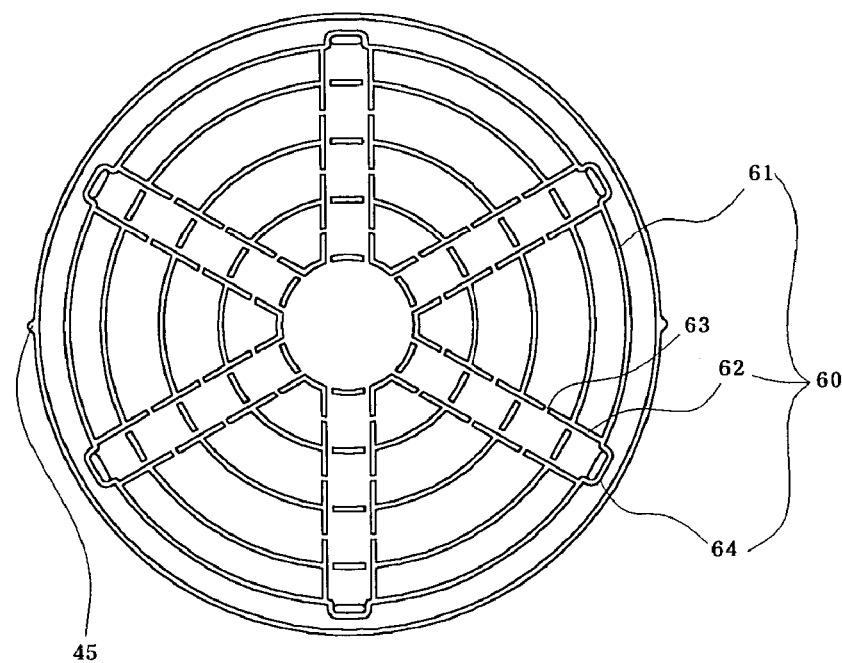
FIG. 6 is a view to show a guide unit provided on an outer surface of a container included in the pot of FIG. 4.
Figure 7:
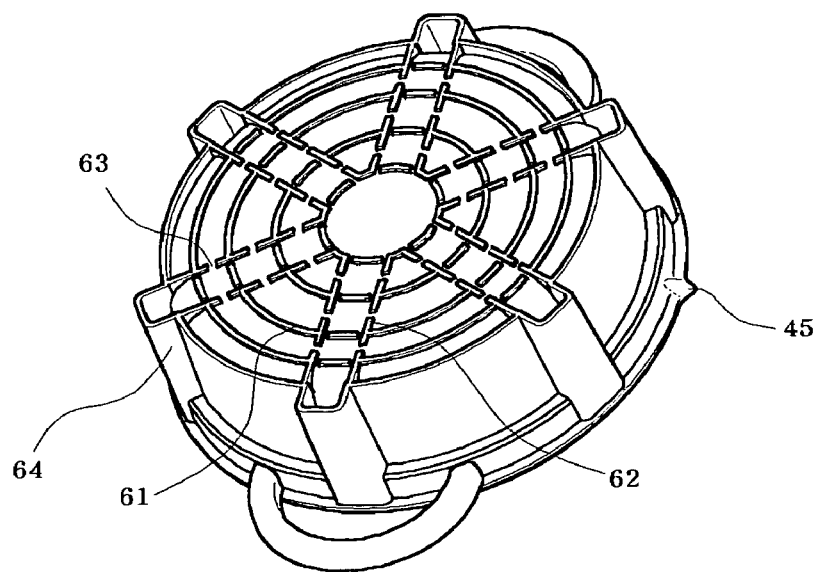
FIG. 7 is a perspective view to show the guide unit, according to the present invention.

FIG. 4 is a perspective view to show a pot, according to the present invention, FIG. 5 is a side sectional view taken along the line A—A of FIG. 4, showing heat transfer in the pot, FIG. 6 is a view to show a guide unit provided on an outer surface of a container included in the pot of FIG. 4, and FIG. 7 is a perspective view to show the guide unit, according to the present invention.

As shown in the drawings, the pot 40 according to the present invention includes a container 41 having space to contain food to be cooked therein.

A heating unit 42 extends outward from an upper end of the container 41. Preferably, one or more air inlet holes 43 are formed on a surface of the heating unit 42 to introduce heated air into the pot.

Further, a seating unit 44 extends upward from an end of the heating unit 42. Preferably, one or more air outlet holes 45 are formed on a surface of the seating unit 44 to discharge expanded and heated air from the pot.

In this case, a lid 46 is seated on the seating unit 44.

The pot is manufactured through die casting or casting. Preferably, the pot is made of a material having excellent heat conductivity, such as stainless steel or aluminum alloy.

Preferably, the air outlet holes 45 each have a shape of a spout which is bent outward. The air outlet holes 45 are integrally formed when the pot is manufactured.

A guide unit 60 protrudes from the outer surface of the container 41 to guide heated air to the air inlet holes 43.

The guide unit 60 may have various shapes to efficiently guide heated air to the air inlet holes 43. Referring to FIGS. 6 and 7, a plurality of circular protrusions 61 having different diameters is concentrically provided on a bottom of the container 41.

Many pairs of guide protrusions 62 are provided on the bottom of the container 41 to cross the circular protrusions 61, thus guiding heated air.

Further, a guide duct 64 is provided on a sidewall of the container 41 to communicate with a space defined between each pair of guide protrusions 62, thus guiding heated air to the air inlet holes 43.

A plurality of air guide gaps 63 is provided at predetermined positions on the guide protrusions 62 located between neighboring circular protrusions 61, thus guiding heated air.

Similarly, air guide gaps 63 are provided at predetermined positions on the circular protrusions 61 located between a pair of guide protrusions 62, thus guiding heated air.

The operation and operational effect of this invention constructed as described above are as follows.

Heat, such as flames, generated by a heating means comes into contact with the outer surface of the container 41 of the pot 40, thus heating the pot 40.

In this case, flames are in direct contact with the bottom of the container 41 to heat it. The interior of the container 41 is heated by heat conducted from the bottom of the container 41 and convection of air heated by the heating means.

At this time, part of the heated air flows through the air inlet holes 43 of the heating unit 42 into the container 41, thus heating an upper layer in the container 41.

Meanwhile, when the pot 40 is heated and air in the pot 40 is expanded, the air is discharged to the outside through the air outlet holes 45 provided on the seating unit 44.

Thus, according to the present invention, food is heated by both heat conducted through the container 41 and convection heat transferred through the air inlet holes 43 into the container 41, thus reducing cooking time.

Moreover, the present invention eliminates a temperature difference between the upper and lower portions in the pot 40, thus heating upper and lower portions of food simultaneously. Therefore, a user need not turn the food over to evenly heat it.

The guide unit 60 is provided on the outer surface of the container 41, thus allowing hot air to efficiently flow into the air inlet holes 43. The movement of hot air will be described below.

When flames generated by the gas range or the like heat the bottom of the container 41, heated air moves between neighboring circular protrusions 61 and is concentrated at a pair of guide protrusions 62 through the air guide gaps 63.

Further, air flowing along the guide protrusions 62 is guided by the guide ducts 64 to prevent the drain of the air to the outside, so that the air flows upward while being fed into the air inlet holes 43.

Thus, the guide unit 60 prevents heated air from escaping into the atmosphere, and guides the concentrated air through the air inlet holes 43 into the container 21, thus enhancing the heating efficiency of the pot 40.

Further, the guide unit 60 protrudes from the outer surface of the pot 40 to increase the contact area with the heating means, thus increasing heat conduction efficiency.

As described above, the present invention provides a double heating-type pot, which is capable of rapidly heating an interior of the pot using both conduction heat and convection heat, thus reducing cooking time.

Further, the present invention prevents a temperature difference between upper and lower portions in the pot, so that a user need not stir food, different from a conventional pot which requires that food be stirred to be evenly heated during cooking.

Furthermore, according to the present invention, a guide unit guides heated air to air inlet holes while preventing the dispersion of the heated air, thus enhancing energy efficiency.

What is claimed is:

1. A double heating pot, comprising:
a container to contain food therein;
a heating unit extending outward from an upper end of the container, with at least one air inlet hole formed at a predetermined position on the heating unit;
a seating unit extending upward from an end of the heating unit, and having at least one air outlet hole, with a lid seated on the seating unit; and
a guide unit protruding from an outer surface of the container to guide heated air to the air inlet hole, said guide unit comprising:
a plurality of circular protrusions concentrically arranged on a bottom of the container and having different diameters;
a plurality of guide protrusions crossing the circular protrusions to guide heated air;

at least one guide duct provided on a sidewall of the container to communicate with a space defined between at least two guide protrusions, thus guiding heated air to the air inlet hole; and air guide gaps provided at predetermined positions on the guide protrusions located between neighboring circular protrusions, and at predetermined positions on the circular protrusions located between guide protrusions, thus guiding the heated air.

2. A double heating pot according to claim 1 wherein said air outlet hole is bent outward.

3. A double heating pot according to claim 1 comprising a plurality of pairs of guide protrusions.

* * * * *